United States Patent [19]

Kaufman

[11] Patent Number: 5,666,415
[45] Date of Patent: Sep. 9, 1997

[54] METHOD AND APPARATUS FOR CRYPTOGRAPHIC AUTHENTICATION

[75] Inventor: Charles William Kaufman, Northboro, Mass.

[73] Assignee: Digital Equipment Corporation, Maynard, Mass.

[21] Appl. No.: 508,766

[22] Filed: Jul. 28, 1995

[51] Int. Cl.$^6$ ...................................................... H04K 1/00
[52] U.S. Cl. ................... 380/23; 380/25; 380/30; 380/28; 380/21; 380/49
[58] Field of Search ................... 380/23, 24, 25, 380/30, 28, 21, 49

[56] References Cited

U.S. PATENT DOCUMENTS

| | | | |
|---|---|---|---|
| 5,260,070 | 11/1993 | Ohta | 395/425 |
| 5,347,580 | 9/1994 | Molva et al. | 380/25 |
| 5,369,705 | 11/1994 | Bird et al. | 380/21 |
| 5,371,794 | 12/1994 | Diffie et al. | 380/21 |
| 5,418,854 | 5/1995 | Kaufman et al. | 380/23 |
| 5,491,750 | 2/1996 | Bellare et al. | 380/21 |
| 5,497,421 | 3/1996 | Kaufman et al. | 380/23 |
| 5,515,439 | 5/1996 | Bantz et al. | 380/23 |

*Primary Examiner*—David C. Cain

[57] ABSTRACT

Method for providing user authentication and a memory for storing a computer program for providing user authentication are described. The method includes the steps of providing a first argument including a one-way cryptographic transformation of a password and a second argument including a one-way cryptographic transformation of a cryptographic combination of the password and a first nonce, computing a first term using the first argument and computing a second term using the first nonce, and comparing the second term with the second argument. The memory storing a computer program, the computer program including, means for providing a first argument including a one-way cryptographic transformation of a password and a second argument including a one-way cryptographic transformation of a cryptographic combination of the password and a first nonce, means for computing a first term using the first argument and computing a second term using the first nonce, and means for comparing the second term with the second argument.

20 Claims, 5 Drawing Sheets

| USERNAME | TERM_1 | TERM_2 |   |
|----------|--------|--------|---|
|          |        |        |   |
|          |        |        |   |
|          |        |        |   |
|          |        |        |   |

*Fig. 2A*

| USERNAME | TERM_1 | R1 |
|----------|--------|----|
|          |        |    |
|          |        |    |
|          |        |    |
|          |        |    |

*Fig. 2B*

| USERNAME | TERM_1 | R1 | R3 |
|----------|--------|----|----|
|          |        |    |    |
|          |        |    |    |
|          |        |    |    |
|          |        |    |    |

*Fig. 2C*

METHOD AND APPARATUS FOR CRYPTOGRAPHIC AUTHENTICATION

BACKGROUND OF THE INVENTION

This invention relates generally to computer system security and more particularly to user authentication.

The wide availability of computers and the corresponding access to computer systems has enabled users access to a large amount of stored information. Through the use of networked computer system capabilities, a user in one location is able to gain access to data stored on a computer system residing in a remote location. To gain access to this information, the user typically sends an identifying message to attempt to gain access to a target computer system. The target computer system checks the message and determines whether the user is authorized to gain access. If the message contains the appropriate information, access is authorized; if the message does not contain the appropriate information, access is denied. This arrangement is known as user authentication. It is a process employed by a computer system by which the computer system may verify the identity of a potential user. It should be noted that although a user is typically a human being, there are instances where the user seeking verification may be another computer.

To implement an authentication system, an administrator of a computer system establishes an account on the system for a prospective user. Typically, this involves adding an entry in a database which will include identifying information about the prospective user, such as a username, and a corresponding password. The user is expected to change the password to something known only to the user after gaining access to the computer system for the first time. Each time the password is changed by the user, the database entry corresponding to that user is updated to reflect the change.

In a typical arrangement, the computer system compares the information included in the identifying message sent by the user to the information stored in the database. If the database entry corresponding to the username supplied by the potential user contains the password which was also provided by the user then access to the computer system is granted. If the password contained in the database entry corresponding to the username provided by the potential user is not the same as the password which was provided by the user, access is denied.

Using the authentication system described above, two basic problems become apparent when considering the security of the system. First of all, an intruder to the system might gain access to the database and determine the passwords for all users of the system. This enables the intruder to masquerade as an authorized user of the system at a later date using the acquired passwords.

The second problem arises when the communication between the computer system and an authorized user wishing to gain access to the computer system is intercepted or eavesdropped on by an intruder. This allows the eavesdropper to determine the authorized user's password which can be used at a later date by the eavesdropper to gain access to the system by posing as the authorized user.

It is thus desirable to provide an authentication system which provides authorized users access to the computer system. Further, the authentication system should also prevent an intruder from obtaining information which would permit the intruder to impersonate an authorized user.

Cryptography is a popular approach used in the effort to provide an optimal authentication system. A cryptographic transformation function takes a message in its original form, known as plaintext, and performs mathematical manipulations on the numerical representation of the message, transforming the message into ciphertext. Ciphertext is a representation of the original message which is unreadable, typically appearing as garbled text. Three types of cryptographic transformation functions which are used to convert plaintext to ciphertext are: secret key functions, public key functions, and hash functions. A secret key function is probably the most intuitive of the three functions and will be described first.

Secret key functions employ bidirectional encryption algorithms. A user selects a secret key which, along with the message to be encrypted, are the inputs to an algorithm. The resulting ciphertext is sent to a recipient where the recipient may be a person or a computer. To read the encrypted message, the recipient must know the user's secret key. Using the user's secret key and the ciphertext as inputs to the same algorithm used to encrypt the message, the recipient is able to decrypt the message into plaintext and thus read the message sent by the user.

Encryption may also be accomplished by using a public key function. A public key function requires two keys, a public key and a private key for each user of the system. The public key for an individual user may be known by all other users of the system. The private key for the individual user should be known only by the individual user.

For user A to send an encrypted message to user B in a public key system, user A must know user B's public key. User A encrypts a message but only those knowing user B's private key may decrypt the message.

One problem with public key cryptography is that most public key algorithms are computationally intensive. That is, they require a lot of processing time to implement and are often slow as a result.

The final method employed to encrypt messages uses hash functions. Hash functions, unlike secret key and public key functions, are one-way encryption algorithms. A hash function takes a message as input and transforms it into a fixed length number. As an example of a hash function, the numerical equivalent of message M is added to a large constant value, squared and divided by a second large constant value where the remainder is used as the hash. In this way, it would be impossible for the process to be reversed such that message M may be determined from the hash. Moreover, it can be seen that several messages may hash to the same value.

Because there is no way in which the transformation may be reversed, hash functions are typically used where a user is simply proving its knowledge of something such as a password, which the receiver also knows. The user applies a hash function to the password and sends the result to the recipient. The recipient either has the hash of the password stored with which to compare or, the recipient also applies the hash function to the password it is expecting to receive and simply compares the result to the hash of the password sent by the user. In this way knowledge of a secret (password) may be shown by the user to the recipient.

In the prior art, there are three commonly used authentication mechanisms based on secret key cryptography and hash functions: We will refer to these as "challenge/response", "storing a hashed password", and "Lamport's Hash". Each of these gives a partial solution of protecting against eavesdropping and revealing the servers database, but none gives as complete a solution as the present invention. Complete solutions using public key cryptography are well known.

3

In a challenge/response scheme, the server holds the password or some transformed version of the password in its database. When a user wishes to authenticate, the server chooses a nonce (a number it will never pick again, such as the current time or a large random number) and sends it to the user. The user cryptographically combines the nonce and the password and returns the result to the server. The server duplicates the user's calculation and if it gets the same answer it assumes the user must know the password. This scheme is secure against eavesdropping, but if anyone can read the server's database, they can impersonate the user.

In a "hashed password" scheme, the server holds not the password but a cryptographically transformed one-way hash of the password. To authenticate, the user sends the server the password, which the server transforms and compares to its stored copy. If they match, it assumes the password is correct. This scheme is secure against someone reading the server's database, but if anyone eavesdrops on an authentication, they can impersonate the user by replaying the authentication message.

In the "Lamport Hash" scheme, the server holds data derived from the password by iteratively one way transforming it a large number of times, say 100. It also holds the number of transformations(n). When a user wishes to authenticate, the server sends the user n. The user then transforms the password n-1 times and sends the result to the server. The server transforms the received data once and compares the result to its stored copy. If they match, it assumes the user knows the password. Further, it updates its database to contain n-1 instead of n and the new value the user sent. This scheme is secure against both eavesdropping and disclosure of the server database, but requires a periodic out-of-band resetting of the user's password when n reaches one.

SUMMARY OF THE INVENTION

In accordance with the present invention, a method is provided for authentication of a user which includes the steps of providing a first argument including a one-way cryptographic transformation of a password and a second argument including a one-way cryptographic transformation of a cryptographic combination of the password and a first nonce, computing a first term using the first argument and computing a second term using the first nonce and comparing the second term with the second argument. With such an arrangement a technique is provided which provides authorized access to a computer system but also prevents an intruder from obtaining information which would permit the intruder to impersonate an authorized user.

In accordance with a further aspect of the present invention, a method is provided for authentication of a user which includes the steps of providing from a user to a server a first argument including a password of the user encrypted using a first one-way cryptographic transformation function and a second argument including said password encrypted using a second one-way cryptographic transformation function and crytographically combined with a nonce providing a first result, with said first result being encrypted using a third one-way cryptographic transformation function; computing by the server a first term including said first argument encrypted using a fourth one-way cryptographic transformation function and a second term including a crytographic combination of said nonce with a first value from a database providing a second result, with said second result being encrypted using said third one-way cryptographic transformation function; and comparing said first term with a second

4 value from the database and said second term with said second argument.

With such an arrangement, a computer system employing this authentication method would be protected against an intruder who gains access to the server's database. This protection is provided by the first argument sent by the user as the server must compute a one-way crytographic transformation of the first argument to compare to the contents of the database. Should an intruder gain access to the database she would be unable to determine the first argument which is to be provided to the server.

The second argument sent by the user provides protection against an eavesdropper. An eavesdropper could intercept the first argument supplied by the user and use it in subsequent attempts to gain access to the server. By incorporating a nonce which changes on each session between the user and server, an eavesdropper would be unable to determine the proper second argument to provide to the server and would therefore be unable to masquerade as an authorized user.

In accordance with a still further aspect of the present invention, a method is provided which provides authentication of a user including the steps of, storing at a server a first nonce and an encrypted quantity, the encrypted quantity being derived from the first nonce and a password, sending the user the first nonce, sending a reply derived from the first nonce to the server, decrypting the encrypted quantity using the reply, and using the decrypted encrypted quantity and a second nonce to generate a new encrypted quantity. The method further includes the steps of selecting a new first nonce, computing a new first value using said new first nonce, and updating the database with the new first value. With such an arrangement, a computer system would be protected against an intruder who both compromises the database and eavesdrops on an authentication exchange because a new first nonce is selected at the end of each authentication exchange.

BRIEF DESCRIPTION OF THE DRAWINGS

The above-mentioned and other features of the invention will now become more apparent by reference to the following description taken in connection with the accompanying drawings in which:

FIG. 2A is a user authentication table resident in the memory of the server node of FIG. 1;

FIG. 2B is a first alternate user authentication table resident in the memory of the server node of FIG. 1;

FIG. 2C is a second alternate user authentication table resident in the memory of the server node of FIG. 1;

DESCRIPTION OF THE PREFERRED EMBODIMENTS

Figure 1:
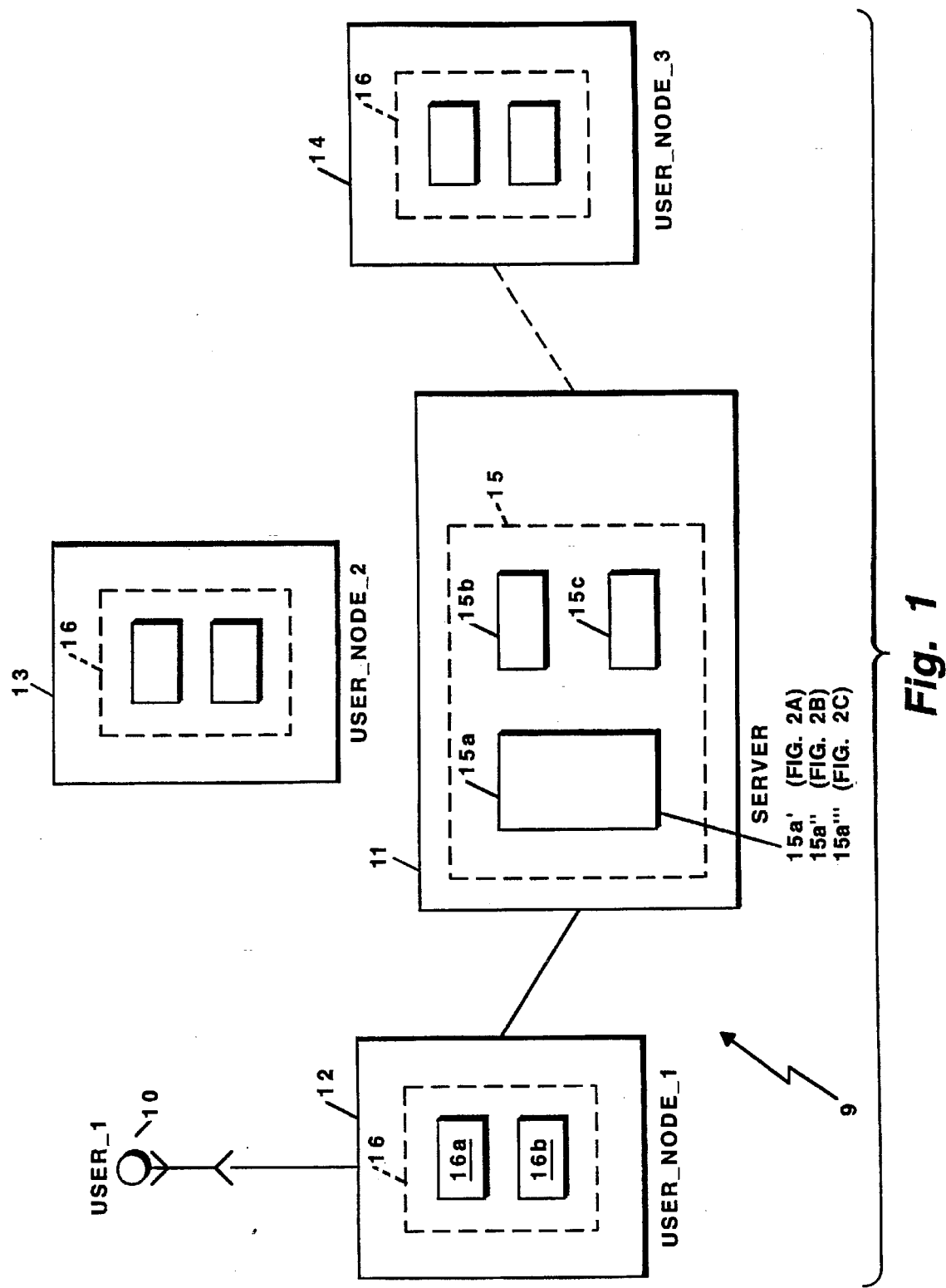
FIG. 1 is a block diagram depicting a computer system including a server node and user nodes coupled to the server node via a network.

Referring to FIG. 1, a networked computer system 9 is shown to include a server node 11 and user nodes, USER_

NODE_1 12, USER_NODE_2 13, and USER_NODE_3 14. The server which 11 includes in its memory 15 a table 15a which includes identifying data for each user which is authorized to access the server node 11, as well as hashing functions 15b and encryption/decryption algorithms 15c which are used by the server node 11 to authenticate users at nodes 12, 13, 14 as authorized to access the server node 11. Also shown is a user, USER_1 10, who is capable of requesting access to the server node 11 through any of the user nodes 12, 13, 14. The details regarding the contents of table 15a, will be discussed in more detail in conjunction with FIGS. 2A, 2B and 2C.

The user nodes 12, 13, 14 also contain, resident in their respective memories 16, hashing functions 16a and encryption/decryption algorithms 16b which are also used in authentication.

Here, USER_1 10 requests access to server node 11 through USER_NODE_1 12. To demonstrate that it is an authorized user, USER_1 10 sends to the server node 11 a secret shared by USER_1 10 and the server node 11. Depending upon the embodiment of the invention employed, the secret sent by USER_1 10 may involve use of the hashing functions 16a and possibly the encryption/decryption algorithms 16b as well. The specific details of each embodiment will be discussed in conjunction with FIGS. 3, 4, and 5.

Server node 11 receives the secret sent by USER_1 10 and using the contents of table 15a in conjunction with the hashing functions 15b and encryption/decryption algorithms 15c, server node 11 determines whether USER_1 10 is an authorized user.

The following key is provided for understanding FIGS. 2-5 and their accompanying text:

Hx(M): (where x is an integer) a cryptographic, one way hash function applied to a message, M, such that it is impossible to determine M given only Hx(M).

{M}K: M encrypted under the key K.

pwd: the user's secret that he is proving knowledge of to the server.

Rx: (where x is an integer) a random number or other "nonce" generated by the server to guarantee that the exchange is different from any previous exchange.

X|Y: crytographically combine X and Y using concatentation.

Referring now to FIG. 2A, the contents of table 15a', which is used in conjunction with a first embodiment of the invention, is shown to include a plurality of entries 17 for users authorized to gain access to the server node 11. Typically, each entry corresponds to a user account which is assigned by a system administrator. Each user entry 17 includes a plurality of fields. Here, a first field 17a corresponds to a username or some identifying information. Typically, the identification information would be a user's first and/or last name or some combination thereof. The table includes a second field 17b corresponding to an entry which is a hash of a user's password, using a first hash function $H_1$ denoted as $H_1(pwd)$. The table 15a' includes a third field 17c which corresponds to an entry which is a hash using a second hash function $H_2$ of a second hash of the password using a third hash function $H_3$, denoted as $H_2(H_3(pwd))$.

To provide the contents of the table 15a', the server node 11 computes $H_1(pwd)$ and stores it in field 17b, and computes $H_2(H_3(pwd))$ and stores it in field 17c for each given password or secret, (pwd), of each authorized user. $H_1(pwd)$ 17b, hereinafter also referred to as TERM_1, is computed by applying hashing function $H_1$ to (pwd). Hashing function $H_1$ is retrieved by the server node 11 from its memory 15b. $H_2(H_3(pwd))$ 17c, hereinafter also referred to as TERM_2, is computed by applying hashing function $H_3$ to (pwd) and then applying hashing function $H_2$ to the result of the previous hash operation on (pwd). Both $H_2$ and $H_3$ are retrieved by the server node 11 from its memory 15b.

Each time a user such as USER_1 10 changes its password or secret, (pwd), new values are calculated for TERM_1 17b and TERM_2 17c to reflect the change and the table 15a' is updated with the new values.

Figure 3:
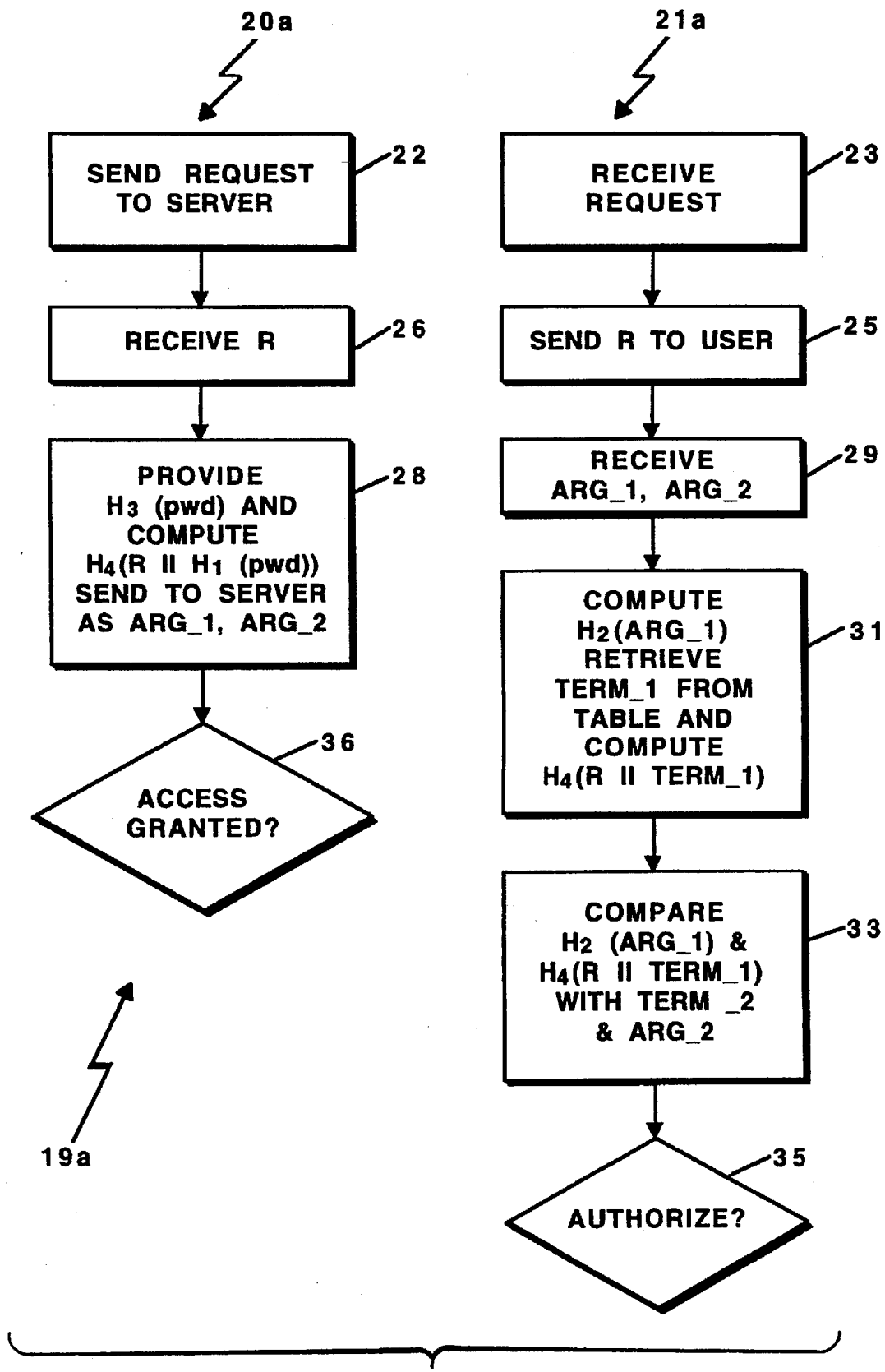
FIG. 3 is a flow chart depicting the steps performed by the server node using the table of FIG. 2A and user node of FIG. 1 to authenticate the user in accordance with a first embodiment of the present invention.

Referring now to FIG. 3, an authentication flow 19a, in accordance with a first embodiment of the invention which uses the information shown in 15a', is shown to include a sequence 20a of steps performed by a user and a sequence 21a of steps performed by a server. The user sequence 20a comprises those steps which are performed by USER_1 10 and USER_NODE_1 12 during an attempt by USER_1 10 to gain access to the server node 11 as part of the authentication flow 19a. The server sequence 21a includes those steps which are performed by the server node 11 in the authentication flow 19a.

The user sequence 20a begins the authentication flow 19a at step 22 with USER_1 10 requesting access to the server node 11, typically by sending a username. After receiving the request (username) at step 23 of the server sequence 21a, the server node 11 sends a random number R to USER_1 10 at step 25. This random number is classified as a "nonce". A "nonce" is a number which, in all probability, would not be selected and used again in these same circumstances. This characteristic is often provided by selecting an R which is very large, typically 128 bits or more.

The authentication flow 19a returns to the user sequence 20a at step 26, where USER_1 10 receives R from the server node 11. At step 28, USER_1 10 provides ARG_1 and ARG_2 to server node 11. ARG_1 is the result of applying hash function $H_3$ to the user's password, (pwd). ARG_1 is computed by USER_NODE_1 12 during the authentication process by retrieving the hash function $H_3$ from the hash functions in USER_NODE_1's 12 memory 16a and applying $H_3$ to USER_1's 10 password.

ARG_2 is computed by retrieving hashing function $H_1$ from memory 16b and applying it to (pwd). The result of the hash operation is cryptographically combined with R. Here, the cryptographic combination is a concatenation of the two values. Hashing function $H_4$ is retrieved from the hashing functions in memory 16b and is applied to the result of the concatentation.

At step 29, control is returned to the server sequence 21a when server node 11 receives ARG_1 and ARG_2 from USER_1 10. The server node 11 at step 31 retrieves $H_2$ from memory 15b and computes $H_2(ARG\_1)$ and retrieves TERM_1 17b from the table 15a in the server node's memory and computes $H_4(R|TERM\_1)$ which requires that R be concatenated to TERM_1 17b and the result of the concatenation be operated on using hashing function $H_4$ which is retrieved from memory 15b. At step 33, the result of $H_2(ARG\_1)$ is compared with TERM_2 17c from the table in the server node's memory and the result of $H_4(R|TERM\_1)$ is compared with ARG_2 which was sent by USER_1 10. If both comparisons are true, that is $H_2(ARG\_1)$ is the same as TERM_2 17c and $H_4(R|TERM\_1)$ is the same as ARG_2, the server node 11 grants USER_1 10 access as an authorized user at step 35. If either comparison is false, access by USER_1 10 to server node 11 is denied at step 35. At step 36 in the user sequence 20b, USER_1 10 receives notification whether is has been granted access to server node 11 or whether access has been denied.

As discussed previously, an optimal authentication system provides protection against intruders who eavesdrop on the communications between an authorized user and the server or who compromise the server's database. In the first embodiment of the invention, the first argument sent by a user protects against intruders gaining access to the server's database whereas the second argument sent by the user protects against eavesdroppers.

The first argument, which is a hash of a password using a third hashing function, provides protection against the server's database being compromised because an intruder accessing the contents of the database would be unable to determine the first argument which is to be provided by an authorized user. The database contains a second hash of the first argument, using a second hashing function. As hashes are one-way encryption algorithms, an intruder to the database would be unable to reverse the hash of the contents of the database, and as such would be unable to provide the proper first argument to the server. To check the validity of the first argument, the server applies a second hashing function to the first argument and compares the result to the server's database contents.

If the communication between the authorized user and the server were eavesdropped on however, an eavesdropper could simply intercept the first argument supplied by the authorized user and use it in subsequent attempts to gain access to the server. The second argument provided by the user however, protects against eavesdroppers.

The second argument provided by the user is a hash of a concatenation of a nonce and a hash of a password. When the user requests access to the server, the server provides the user a nonce which is a randomly selected number. As the nonce changes each time access is requested, an eavesdropper would be unable to gain sufficient information with which to provide a second argument during a subsequent exchange between the eavesdropper and the server. To check the validity of the second argument, the server accesses a first term in the database, which is a first hash of the user's password, and concatenates the current nonce, R, to the value and applies a fourth hash to the result of the concatenation comparing the result to the second argument sent by the user.

One weakness present in the first embodiment of the invention is encountered when the server database is compromised and a communication between an authorized user and the server is eavesdropped on. These acts need not occur simultaneously, as long as the database contents have not changed between the compromise and the eavesdropping. This situation would provide an intruder sufficient information with which to gain access to the server posing as an authorized user. More secure authentication systems are discussed in conjunction with FIGS. 2B and 4 and FIGS. 2C and 5.

Referring now to FIG. 2B, the contents of table 15a", which is used in conjunction with a second embodiment of the invention, is shown to include a plurality of entries 17 for users authorized to gain access to the server node 11. Typically, each entry corresponds to a user account which is assigned by a system administrator. Each user entry 17 includes a plurality of fields.

Here, a first field 17a" of the table 15a" corresponds to a username or some identifying information. Typically, the identification information would be a user's first and/or last name or some combination thereof. The table 15a" includes a second field 17b" TERM_1 corresponding to an entry which is an encryption of a message where the message is a hash of a user's password, using a first hash function $H_1$.

The key under which the message is encrypted is a hash of a result of a concatenation between a hash of a user's password or other message, using a first hash function $H_1$, and a nonce, the hash of the result of the concatenation using a second hash function $H_2$. The contents of the second field 17b" is denoted as $\{H_1(pwd)\}H_2(R_1\|H_1(pwd))$ where $\{H_1(pwd)\}$ is encrypted using the key $H_2(R_1\|H_1(pwd))$. The table 15a" also includes a third field 17c" TERM_2 which corresponds to an entry which corresponds to a nonce, denoted as $R_1$.

The contents of table 15a" are changed as a result of two different occurrences. The first occurrence is when a user, such as USER_1 10, changes its password, (pwd), new values are determined for TERM_1 17b" and TERM_2 17c" to reflect the change and table 15a" is updated with the new values.

The second occurrence is at the conclusion of an authentication exchange with a user. Once the user's response is verified, the server node 11 selects a new first nonce, $R_1$, and updates TERM_1 17b" and TERM_2 17c" to reflect the change.

Figure 4:
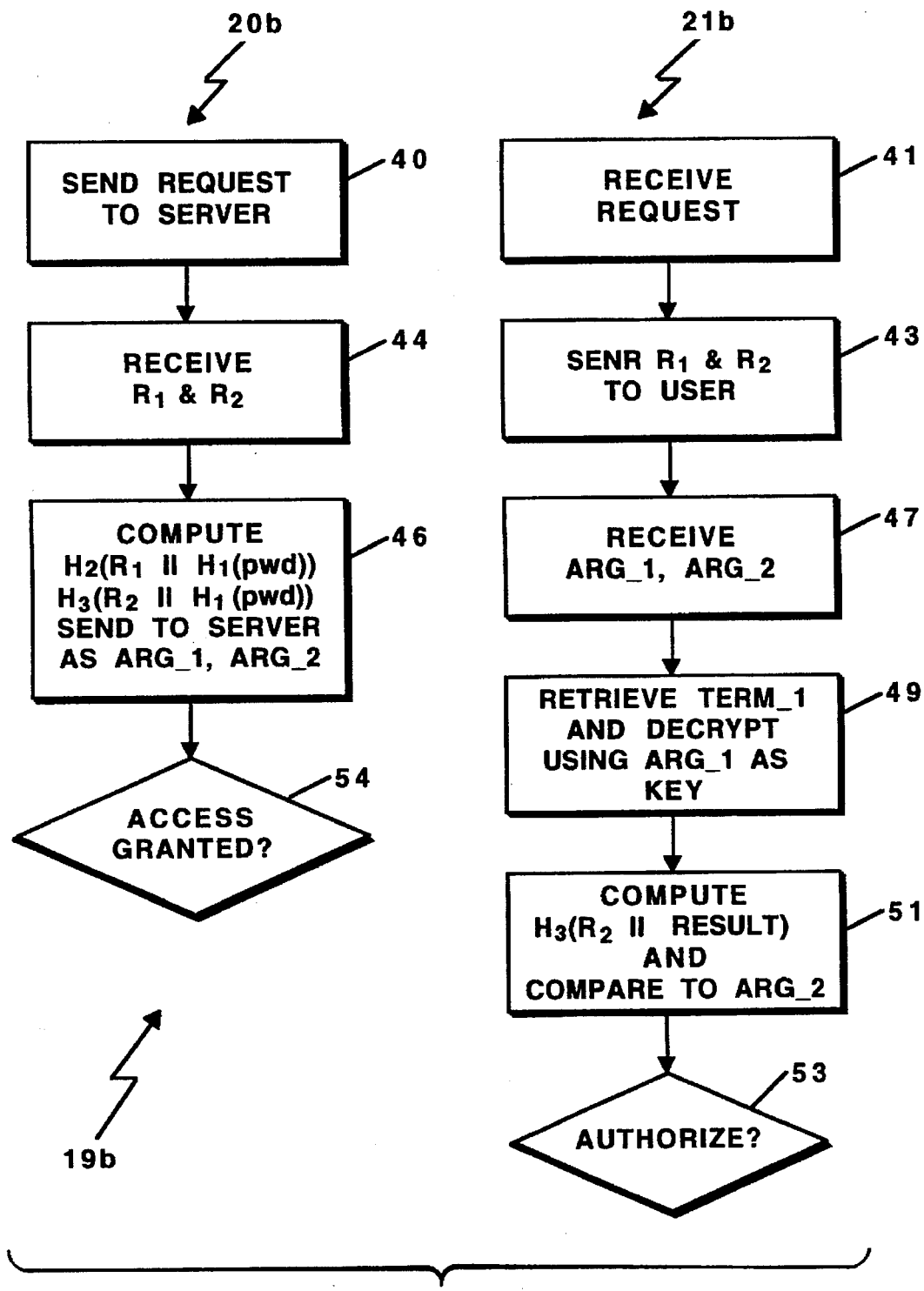
FIG. 4 is a flow chart depicting the steps performed by the server node using the table of FIG. 2B and user node of FIG. 1 to authenticate the user in accordance with a second embodiment of the present invention.

Referring now to FIG. 4, an authentication flow 19b, in accordance with a second embodiment of the invention which uses the information shown in 15a", is shown to include a sequence 20b of steps performed by a user and a sequence 21b of steps performed by a server. The user sequence 20b includes those steps performed by USER_1 10 and USER_NODE_1 12 in the authentication flow 19b. The server sequence 21b comprises those steps performed by the server node 11 in the authentication flow 19b.

The authentication flow 19b begins at step 40 of the user sequence 20b, with USER_1 10 requesting access to the server node 11, typically by sending a username. At step 41 of the server sequence 21b, the server node 11 receives the request (username) from USER_1 10. The server node 11 responds to the request from USER_1 10 at step 43 by sending $R_1$ 17c" and $R_2$ to USER_1 10. $R_1$ and $R_2$ are nonces generated by the server node 11, where $R_1$ 17c" is retrieved from memory 15a. Again, these nonces may be sent subsequent to USER_1's 10 access request or they may be sent during a prior authorized exchange between USER_1 10 and the server node 11.

The authentication flow 19b returns control to the user sequence 20b at step 44 where USER_1 10 receives $R_1$ 17c" and $R_2$ from the server node 11. At step 46, USER_1 10 provides ARG_1 and ARG_2 to server node 11. ARG_1 and ARG_2 are computed by USER_NODE$_{13}$ 1 12 by retrieving hashing functions $H_1$, $H_2$ and $H_3$ from memory 16a in USER_NODE_1 12. ARG_1, $H_2(R_1\|H_1(pwd))$, is computed by hashing (pwd) with hashing function $H_1$, concatenating the result with $R_1$ and hashing the result of the concatenation using hashing function $H_2$. ARG_2, $H_3(R_2\|H_1(pwd))$, is computed by concatenating $R_2$ with the result of $H_1(pwd)$ and hashing the result of the concatenation with hashing function $H_3$.

Control transfers to the server sequence 21b where the server node 11 receives ARG_1, ARG_2 at step 47. At step 49, the server node 11 retrieves TERM_1 17b" from memory 15a and decrypts TERM_1 17b" using ARG_1 as a key to an decryption algorithm retrieved from memory 15c. TERM_1 17b" is decrypted to provide a "RESULT", by providing both TERM_1 17b" and ARG_1 as inputs to the decryption algorithm retrieved from memory 15c. At step 51, the server node 11 uses the result of step 49 to compute $H_3(R_2\|RESULT)$. This computation is done by concatenating $R_2$ to RESULT from step 49 and then hashing the result of the concatenation using hashing function $H_3$ from memory $15b$. The result of the hashing function is then compared to ARG_2. If there is a match, USER_1 10 is authorized access to the server node 11 at step 53, otherwise, access is denied. Once the server node 11 verifies USER$_{13}$ 1's 10 response, a new $R_1$ is selected and table entries $17b''$ and $17c''$ in memory $15a''$ are recomputed. At step 54, USER_1 10 receives notification of whether access was granted or denied by the server node 11 at step 53.

The second embodiment of the invention provides protection against a compromise of the server database coupled with an eavesdropping on an authentication exchange. Because a new $R_1$ is selected at the end of each authentication exchange, eavesdropping on an exchange and reading the database will not allow an intruder to impersonate an authorized user unless it is exactly the next authentication following the reading of the database. Should a situation occur where the server was unable to select a new $R_1$ and update the database, (i.e. the system crashed before updating the database or the database was restored from a backup state) the second nonce, which is sent during the authentication process, would protect against eavesdroppers.

The second embodiment includes the user providing to the server two arguments, the first argument being a second hash of the result of a concatenation of a first nonce and a first hash of a password. The second argument is a third hash of the result of a concatenation of a second nonce and a first hash of a password. The first nonce is provided to the user by the server from the database and the second nonce is generated during the authentication process.

The server checks the user's response by decrypting a first term in the server database using the first argument provided by the user. The result of the decryption, which is a first hash of the user's password, is used to verify the second argument by concatenating the result of the decryption to a second nonce and applying a third hashing function to the result of the concatenation. Once the response has been verified, the server generates a new first nonce and updates the contents of the database accordingly.

Referring now to FIG. 2C, the contents of table $15a'''$, which is used in conjunction with a third embodiment of the invention, is shown to include a plurality of entries 17 for users authorized to gain access to the server node 11. Typically, each entry corresponds to a user account which is assigned by a system administrator. Each user entry 17 includes a plurality of fields.

Here, a first field $17a'''$ of the table $15a'''$ corresponds to a username or some identifying information. Typically, the identification information would be a user's first and/or last name or some combination thereof. The table $15a'''$ includes a second field $17b'''$ corresponding to an entry which is an encryption of a message. Here, the message is a hash of a user's password or other message concatenated with a third nonce, using a first hash function $H_1$. The key under which the message is encrypted is a hash of a result of a concatenation between a hash of a user's password or other message and a first nonce $R_1$ where the user's password is first concatenated with a third nonce $R_3$ before being hashed using a first hashing function $H_1$. The contents of the second field $17b'''$ is denoted as $\{H_1(pwd\|R_3)\}H_2(R_1\|H_1(pwd\|R_3))$ where $\{H_1(pwd\|R_3)\}$ is encrypted using $H_2(R_1\|H_1(pwd\|R_3))$ as a key. The table $15a'''$ also includes a third field $17c'''$, which corresponds to an entry which is a first nonce, denoted as $R_1$ and a fourth field $17d'''$, which corresponds to an entry which is a third nonce, denoted as $R_3$.

The contents of table $15a'''$ are updated as a result of three different occurrences. The first occurrence takes place when a user, such as USER_1 10, changes its password, (pwd). In response to the user selecting a new password, the server node 11 selects several pairs of a new first nonce, $R_1$, and a new third nonce, $R_3$. These nonce pairs and the new user password are used by the server node 11 to determine new values, called triplets, for the appropriate table $15a'''$ fields, $17b'''$, $17c'''$ and $17d'''$. One set of triplets is used to update the table $15a'''$ fields $17b'''$, $17c'''$ and $17d'''$. The remaining triplets are kept in reserve, that is stored somewhere separate from table $15a'''$ such that they are unlikely to be revealed even if table $15a'''$ is revealed. An example might be a backup tape of floppy disk stored in a safe. These remaining triplets are to be used if it is determined that table $15a'''$ has been compromised.

The second occurrence takes place when it is discovered that table $15a'''$ has been compromised by an intruder. Should this occur, one of the backup triplets is selected and the appropriate table fields, $17b'''$, $17c'''$ and $17d'''$ are updated.

The third occurrence is at the conclusion of an authentication exchange with a user. Once the user's response is verified, the server node 11 selects a new first nonce, $R_1$, and updates the appropriate fields of table $15a'''$. As discussed previously, the server node 11 may also select one of the triplets which are on reserve from the last time the user's password was changed and the server node 11 selected new $R_1/R_3$ pairs.

Figure 5:
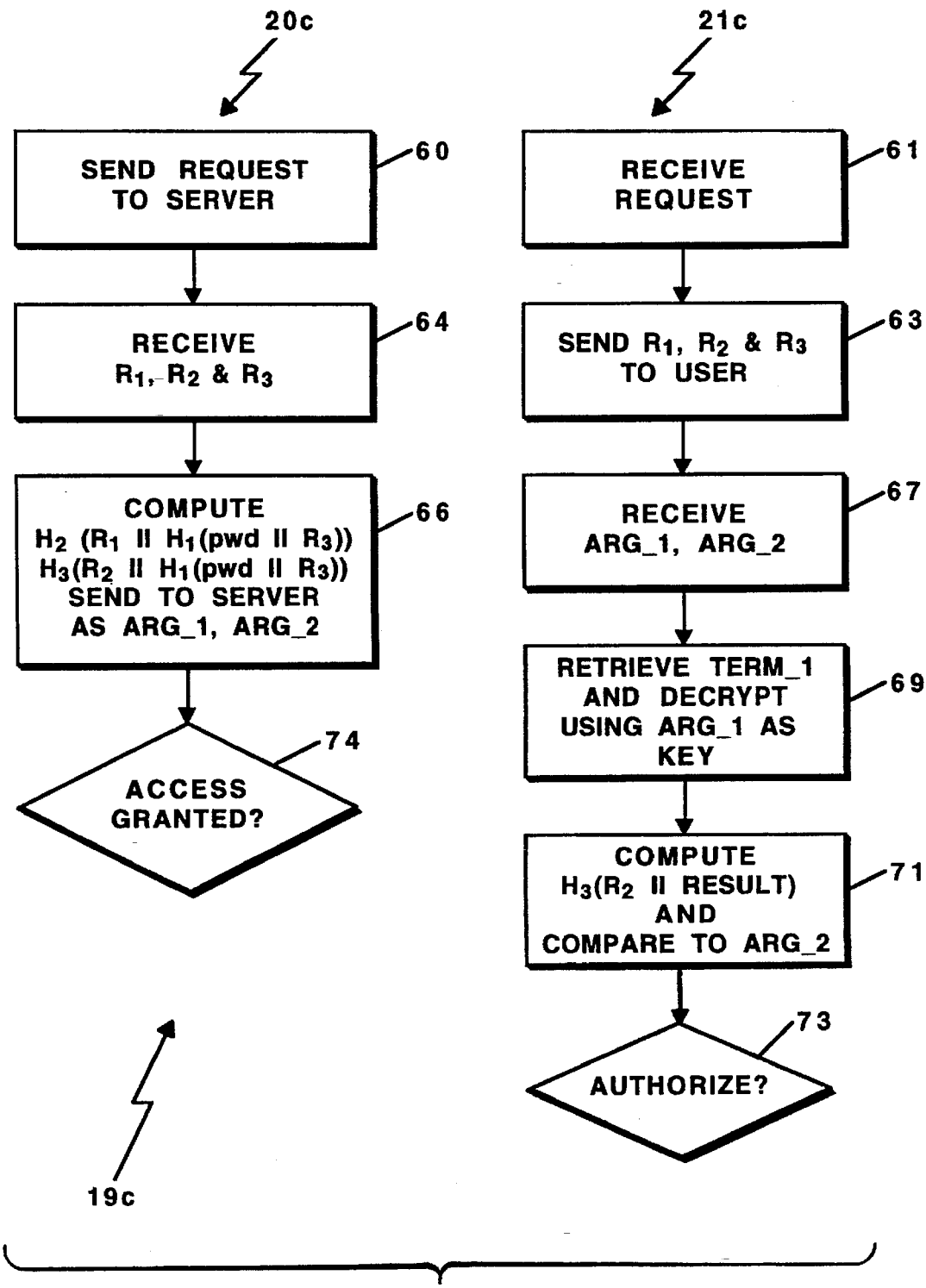
FIG. 5 is a flow chart depicting the steps performed by the server node using the table of FIG. 2C and user node of FIG. 1 to authenticate the user in accordance with a third embodiment of the present invention.

Referring now to FIG. 5, an authentication flow $19c$, in accordance with a third embodiment of the invention which uses the information shown in $15a'''$, is shown to include a sequence $20c$ of steps performed by a user and a sequence $21c$ of steps performed by a server. The user sequence $20c$ comprises those steps performed by USER_1 10 in the authentication flow $19c$. The server sequence $21c$ includes those steps performed by the server node 11 in the authentication flow $19c$.

The authentication flow $19c$ begins with USER_1 10 sending an access request to server node 11 at step 60 of user sequence $20c$. The server node 11 receives the request from USER_1 10 at step 61 of the server sequence $21c$. In response to the request, the server node 11 sends $R_1$ $17c'''$, $R_2$ and $R_3$ $17d'''$ to USER_1 10 at step 63. $R_1$ $17c'''$ and $R_3$ $17d'''$ are retrieved from memory $15a'''$ and $R_2$ is randomly generated.

USER_1 10, receives $R_1$ $17c'''$, $R_2$ and $R_3$ $17d'''$ from the server node 11 at step 64. At step 66, USER_NODE_1 12 computes $H_2(R_1\|H_1(pwd\|R_3))$ using $R_1 17c'''$ and $R_3$ $17d'''$ as sent from the server node 11 and retrieves $H_1$ and $H_2$ from memory $16a$. First, (pwd) is concatenated to $R_3$ $17d'''$. The result of the concatenation is hashed using hashing function $H_1$ from memory $16b$. The result of the hashing function is concatenated to $R_1$ $17c'''$, and the result of the concatenation is hashed using hashing function $H_2$ from memory $16b$.

USER_NODE_1 12 also computes $H_3(R_2\|H_1(pwd\|R_3))$ at step 66 using $R_2$ and $R_3$ $17d'''$ as sent from the server node 11 and retrieves $H_1$ and $H_3$ from memory $16a$. Here, (pwd) is also concatenated to $R_3$ $17d'''$. The result of the concatenation is then hashed using hashing function $H_1$ from memory $16b$. The result of the hashing function is concatenated to $R_2$, and the result of the concatenation is hashed using hashing function $H_3$ from memory $16b$. These two values are sent to the server node 11 as ARG_1, ARG_2.

At step 67 control is returned to the server sequence $21c$ when the server node 11 receives ARG_1 and ARG_2. The server node 11 retrieves TERM_1 $17b'''$ from memory $15a'''$ and decrypts TERM_1 $17b'''$ using ARG_1 as the key to a decryption algorithm retrieved from memory $15c$ at step 69. TERM_1 $17b'''$ is decrypted by providing it and ARG_1 as inputs to the decryption algorithm retrieved from memory 15c. Using the result of step 69, the server node 11 computes $H_3(R_2 \| RESULT)$ by concatenating $R_2$ with RESULT and hashing the result of the concatenation using hashing function $H_3$ as retrieved from memory 15b. The result of the hash is compared to ARG_2. USER_1 10 is authorized access to the server node 11 if the values match or denied access if the values do not match at step 73. Once USER_1's 10 response (ARG_1, ARG_2) has been verified, the server node 11 selects a new $R_1$ and recomputes the table entries 17b''', 17c''' and 17d''' in memory 15a. $R_3$ is not changed unless the user's password changes or if it is determined that table 15a''' has been compromised.

If the user's password changes, several $R_3/R_1$ pairs are chosen and corresponding database entries are determined accordingly. Only one such group of entries are kept online in the server database whereas the remaining entries are kept in reserve, stored somewhere outside of the server, for example on a backup tape of floppy disk kept in a safe, in case the server database is compromised. If a compromise is discovered, the server uses one of the alternate databases during an authentication exchange, thus making the information read by the intruder worthless for purposes of impersonating an authorized user. At step 74 of the user flow 20c, USER_1 10 is notified whether is has been granted access to the server node 11 or if access has been denied.

The third embodiment of the invention, like the second embodiment, provides protection against a compromise of the server database coupled with an eavesdropping on an authentication exchange. Because the server database is updated as part of each authentication, eavesdropping on an authentication exchange and reading the server database will not permit the intruder to impersonate a user unless it is exactly the authentication following the reading of the server database. It also provides protection to a user who uses the same password on two distinct servers from having a compromise with respect to one server allow the user to be impersonated the other.

In the third embodiment of the invention, the user provides two arguments to the server in response to the server sending the user three nonces. Two of the nonces are taken from the server database, the third is generated during the authentication process.

The first argument includes several concatenations followed by applications of hashing functions on the result of each concatenation. The user's password is concatenated with a third nonce, the result of the concatenation being hashed, using a first hashing function. The result of the first hash is concatenated with a first nonce, the result of the concatenation being hashed, using a second hashing function.

The second argument also involves concatenating a third nonce with the user's password and applying a first hashing function. The result of the first hash is concatenated with a second nonce, the result of the concatenation being hashed, using a third hashing function.

The server checks the user's response by decrypting a value found in the server database using the first argument returned by the user as a key to a decryption algorithm. The result of the decryption, which should be a first hash of the result of a concatenation of the user's password with a third nonce, is used by the server to check the second argument sent by the user. The server simply concatenates the result of the decryption with a second nonce and applies the third hashing function to the result of the concatenation. Access is then granted or denied based upon whether the second argument matches the final result.

Having described preferred embodiments of the invention, it will now become apparent to those of skill in the art that other embodiments incorporating its concepts may be provided. It is felt therefore that this invention should not be limited to the disclosed embodiments but rather should be limited only by the spirit and scope of the appended claims.

What is claimed is:

1. A method for providing authentication of a user including the steps of:

providing a first argument including a one-way cryptographic transformation of a password and a second argument including a one-way cryptographic transformation of a cryptographic combination of the password and a first nonce;

computing a first term using the first argument and computing a second term using the first nonce; and comparing the second term with the second argument.

2. The method as recited in claim 1 wherein the step of providing a first term includes the step of:

applying a first one-way cryptographic function to the first argument.

3. The method of claim 2 wherein the step of computing a second term includes the substeps of:

retrieving a first value from a first database;

providing a first result comprising a cryptographic combination of the first value and the first nonce; and applying a second one-way cryptographic function to said first result.

4. The method of claim 3 further comprising the steps of:

retrieving a second value from the first database; and comparing the first term with the second value.

5. The method of claim 1 wherein the step of providing a first argument includes the substeps of:

providing a first result comprising a cryptographic combination of a second nonce and the one-way cryptographic transformation of the password; and applying a third one-way cryptographic transformation function to said first result.

6. The method of claim 5 further including the step of:

cryptographically combining the password and a third nonce prior to said step of providing a first argument and a second argument.

7. The method of claim 6 wherein the step of computing a first term includes the step of:

retrieving a third value from a second database; and applying a bidirectional cryptographic transformation function to the third value and the first argument.

8. The method of claim 7 wherein the step of computing a second term includes the step of:

applying a fourth one-way cryptographic transformation function to a cryptographic combination of the first term and the first nonce.

9. A method for providing authentication of a user including the steps of:

providing from a user to a server a first argument including a password of the user encrypted using a first one-way cryptographic transformation function and a second argument including said password encrypted using a second one-way cryptographic transformation function and crytographically combined with a nonce providing a first result, with said first result being encrypted using a third one-way cryptographic transformation function;

computing by the server a first term including said first argument encrypted using a fourth one-way cryptographic transformation function and a second term including a crytographic combination of said nonce with a first value from a database providing a second result, with said second result being encrypted using said third one-way cryptographic transformation function; and comparing said first term with a second value from the database and said second term with said second argument.

10. The method of claim 9 wherein prior to said providing step said method includes the step of:

providing said nonce, by the server, in response to a request for access to the server by the user.

11. The method of claim 9 further including the step of:

providing, during an authorized communication between the user and the server, said nonce for use during a subsequent authentication.

12. A method for providing authentication of a user including the steps of:

providing from a user to a server a first argument being an expression encrypted using a first one-way cryptographic transformation function cryptographically combined with a first nonce and with the first nonce cryptographically combined with said expression being encrypted using a second one-way cryptographic transformation function, and a second argument being said expression encrypted using said first one-way cryptographic transformation function cryptographically combined with a second nonce and with the second nonce cryptographically combined with said expression encrypted using a third one-way cryptographic transformation function;

computing by the server a first term including a decryption of a first value from a database using said first argument as a key to a decryption algorithm;

computing by the server a second term including said first term cryptographically combined with said second nonce, encrypted using said third one-way cryptographic transformation function; and comparing said second term with said second argument.

13. The method of claim 12 wherein said expression is a password of said user.

14. The method of claim 12 wherein said expression is the result of a cryptographic combination of a password of said user with a third nonce.

15. The method of claim 13 wherein prior to said step of providing, the method includes the step of:

providing said first nonce and a randomly selected value as said second nonce, by the server in response to a request for access to the server by the user.

16. The method of claim 14 further including the step of:

providing said first nonce, said third nonce and a randomly selected value as said second nonce, by the server, in response to a request for access to the server by the user.

17. The method of claim 12 further including subsequent to said step of comparing, the steps of:

selecting a new first nonce;

computing a new first value using said new first nonce; and updating the database with the new first value.

18. A method for providing authentication of a user comprising the steps of:

storing at a server a first nonce and an encrypted quantity, said encrypted quantity being derived from said first nonce and a password;

sending the user said first nonce;

sending a reply derived from said first nonce to the server;

decrypting said encrypted quantity using said reply; and using said decrypted encrypted quantity and a second nonce to generate a new encrypted quantity.

19. A memory storing a computer program for providing a user authentication system for use on a computer system said computer program comprising:

means for providing a first argument including a password of a user encrypted using a third hashing function and a second argument including said password encrypted using a first hashing function and crytographically combined with a nonce providing a first result, with said first result being encrypted using a fourth hashing function;

means for computing a first term including said first argument encrypted using a second hashing function and a second term including a crytographic combination of said nonce with a first value from a database providing a second result, with said second result being encrypted using a fourth hashing function; and means for comparing said first term with a second value from the database and said second term with said second argument.

20. A memory storing a computer program for providing a user authentication system for use on a computer system said computer program comprising:

means for providing a first argument including an expression encrypted using a first hashing function providing a first result with said first result being cryptographically combined with a first nonce providing a second result with said second result being encrypted using a second hashing function and a second argument including said expression encrypted using said first hashing function providing a third result with said third result being crytographically combined with a second nonce providing a fourth result with said fourth result being encrypted using a third hashing function;

means for computing a first term including a decryption of a first value from a database using said first argument as a key to a decryption algorithm;

means for computing a second term including said first term crytographically combined with said second nonce providing a fifth result with said fifth result being encrypted using said third hashing function; and means for comparing said second term with said second argument.

* * * * *